United States Patent [19]

Claussen et al.

[11] Patent Number: 4,767,727
[45] Date of Patent: Aug. 30, 1988

[54] FIBRE-STRENGTHENED CERAMIC FORMED BODIES

[75] Inventors: Nils Claussen, Leonberg; Günter Petzow, Leinfelden-Echterdingen, both of Fed. Rep. of Germany

[73] Assignee: Max-Planck-Gesellschaft Zur Foerderung Der Wissenschaften E.V., Goettingen, Fed. Rep. of Germany

[21] Appl. No.: 867,461

[22] Filed: May 23, 1986

[30] Foreign Application Priority Data

May 24, 1985 [DE] Fed. Rep. of Germany ....... 3518844

[51] Int. Cl.⁴ ...................... C04B 35/80; C04B 35/10; C04B 35/48; C04B 35/56
[52] U.S. Cl. ........................................ 501/87; 501/88; 501/89; 501/91; 501/92; 501/95; 501/97; 501/103; 501/105
[58] Field of Search ...................... 501/95, 88, 89, 87, 501/91, 92, 97, 103, 105

[56] References Cited

U.S. PATENT DOCUMENTS 4,507,224 3/1985 Toibana et al. ...................... 501/88
4,525,464 6/1985 Claussen .

FOREIGN PATENT DOCUMENTS 0102590 3/1984 European Pat. Off. .
0175329 3/1986 European Pat. Off. .
0194811 9/1986 European Pat. Off. .

OTHER PUBLICATIONS

Ceramic Engineering and Science Proceedings, Jul.-Aug. 1984, pp. 513-527.
SAE Proceedings of the Twenty-First Automotive Technology Development Contractors' Coordination Meeting p. 138, Mar., 1984, pp. 215-222.
American Ceramic Society Bulletin, Feb. 1985, pp. 298-304.

Primary Examiner—Mark L. Bell
Attorney, Agent, or Firm—Felfe & Lynch

[57] ABSTRACT

The present invention provides a fibre-strengthened ceramic formed body with improved mechanical strength, wherein it contains at least 15% by volume of zirconium dioxide, hafnium dioxide or zirconium dioxide/hafnium dioxide composition in the form of monoclinic crystals and an amount of inorganic fibres sufficient for increasing the strength, which is obtainable by hot pressing a mixture of ceramic matrix materials, at least 15% by volume of tetragonal zirconium dioxide, hafnium dioxide or zirconium dioxide/hafnium dioxide composition particles and the fibres at a temperature above the tetragonal→monoclinic transition temperature.

The present invention also provides a process for the production of such a ceramic formed body.

12 Claims, 2 Drawing Sheets

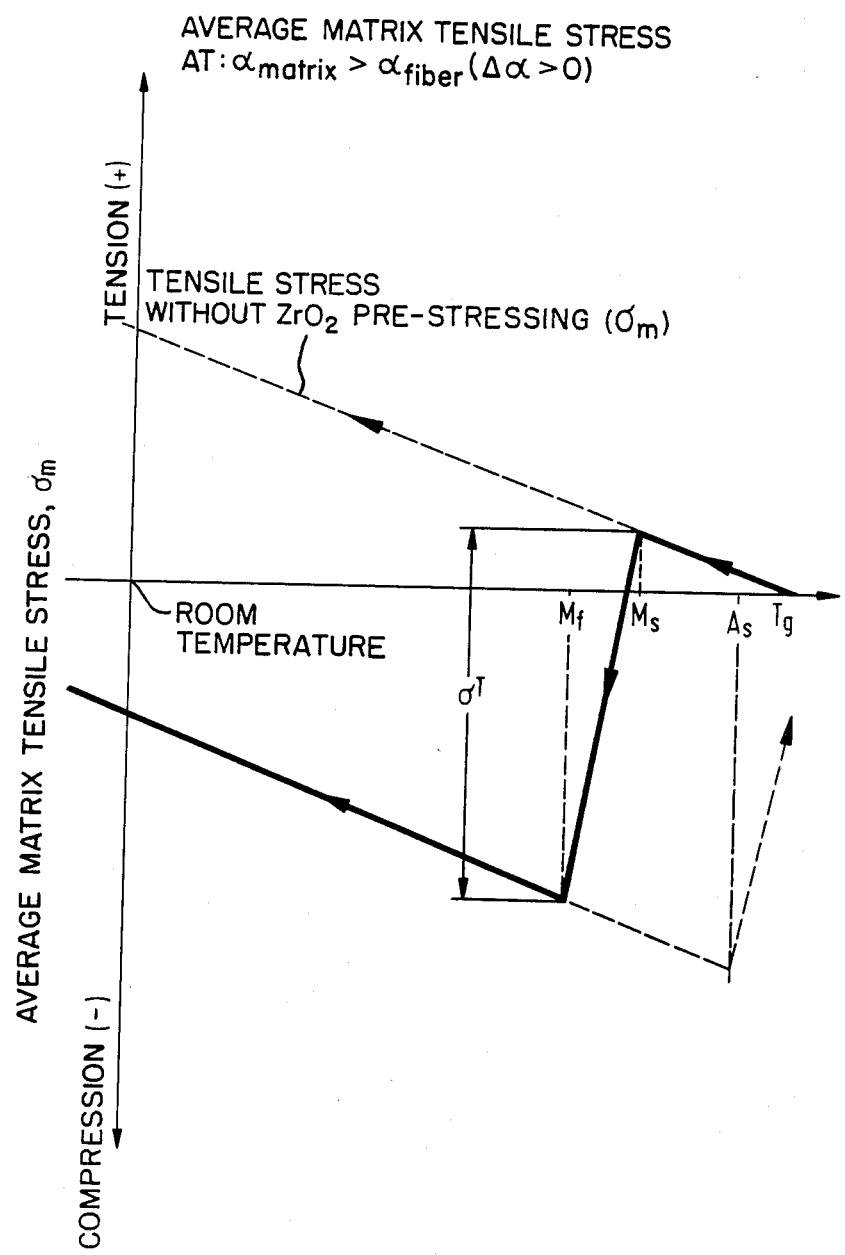

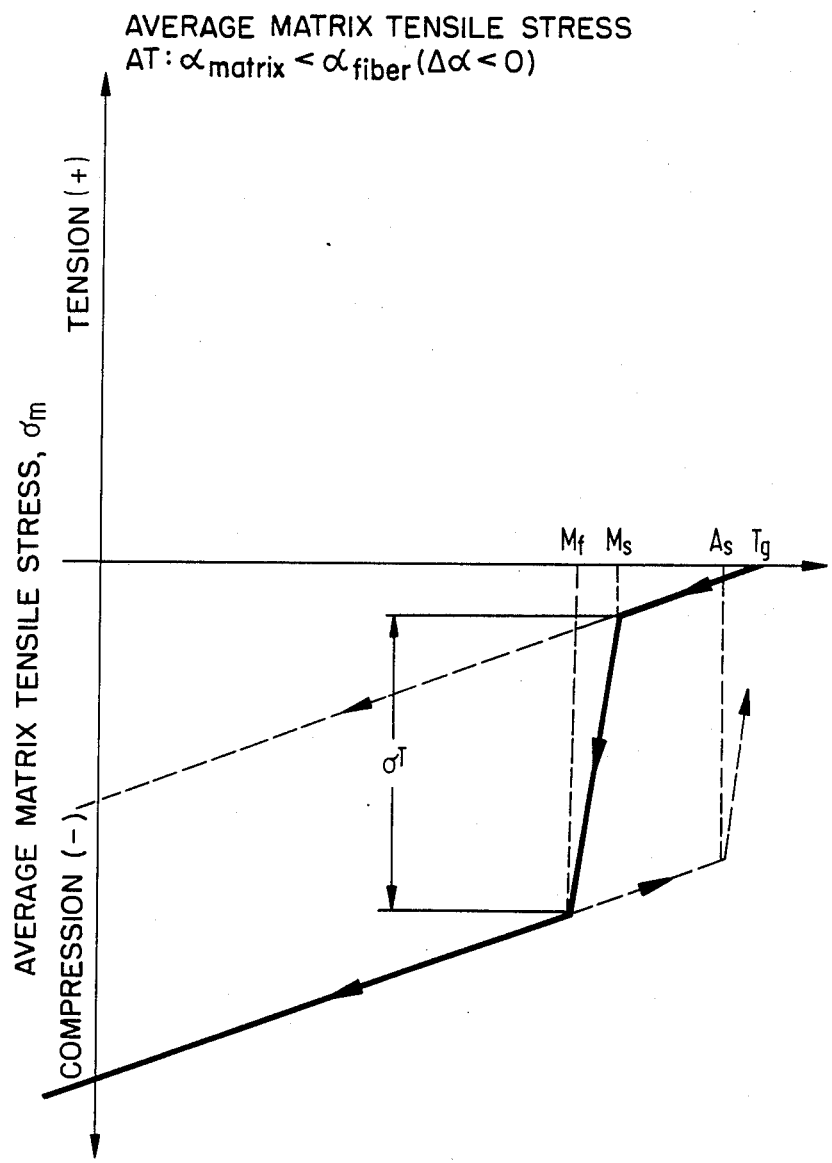

FIBRE-STRENGTHENED CERAMIC FORMED BODIES

The present invention is concerned with a fibre-strengthened or reinforced ceramic formed body and with a process for the production thereof.

Ceramic materials can be strengthened by the incorporation of fibres (see, inter alia, (a) D. C. Phillips, AERE Harwell Report No. AERE-R 10056, UK, February, 1981; (b) O. B. Marshall and A. G. Evans, J. Am. Ceram. Soc., 68, 330/1985; (c) D. C. Phillips, Fiber Reinforced Ceramics in Handbook of Composites, Vol. 4, Elsevier Science Publ., 1983, pp. 374–427).

However, during the sintering and hot pressing procedure, in most cases, the good mechanical properties of the fibres are, in part, considerably impaired by particle growth of the usually finely crystalline fibres, by reactions with the ceramic matrix, by multiple breakage and the like. In contradistinction to polycrystalline fibres, monocrystalline fibres (whiskers) withstand the introduction into a ceramic matrix practically unaffected (see, inter alia, P. F. Becher, J. Am. Ceram. Soc., 67, C-267/1984). This is due, inter alia, to the extraordinarily high mechanical strength (SiC whiskers: up to 20 GPa, $Al_2O_3$ whiskers up to 5 GPa), to the high elasticity modules (SiC: 500 to 700 GPa, $Al_2O_3$: >400 GPa) and to the mostly theoretical density (i.e. no pores with gas inclusions, no grain boundaries and the like).

In spite of these good theoretical prerequisites for a strengthening, the whisker properties can only be transmitted insufficiently to the ceramic matrix since chemical (strong) bonds between whiskers and matrix, especially at lower and average temperatures, lead to stress singularities (see B. A. Bender, D. Lewis, W. S. Coblenz and R. W. Rice, Ceram. Eng. Sci. Proc., 5, 513/1984) which, after the formation of a matrix crack, also lead to breakage of the whisker. Only in the rare cases in which the boundary surface strength between matrix and fibre/whisker is relatively low and thus leads to a pull-out of the whisker are these singularities avoided and the inherent strength of the whisker can be utilised.

Therefore, the problem with which the present invention is concerned is to overcome the above-described difficulties in the case of the previously known fibre-strengthened ceramic work materials and to provide such a work material in which the strength properties of the strengthening fibres are transferred to the matrix. In particular, it is an object of the present invention to bring about, in the case of such formed bodies, high breaking strengths up to temperatures of about 1000° C., namely, also when a chemical bonding takes place between the strengthening material and the matrix, and also to achieve effective strengthenings when the thermal coefficients of expansion of the strengthening fibres are smaller than those of the matrix and finally also to achieve a strengthening effect in the case of a small fibre volume proportion which makes possible a pressureless sintering and thus a hot isostatic post-consolidation without encapsulation.

Thus, according to the present invention, there is provided a fibre-strengthened ceramic formed body with improved mechanical strength, wherein it contains at least 15% by volume of zirconium dioxide, hafnium dioxide or zirconium dioxide/hafnium dioxide composition in the form of monoclinic crystals and an amount of inorganic fibres sufficient for increasing the strength, which is obtainable by hot pressing a mixture of ceramic matrix materials, at least 15% by volume of tetragonal zirconium dioxide, hafnium dioxide or zirconium dioxide/hafnium dioxide composition particles and the fibres at a temperature above the tetragonal→monoclinic transition temperature.

The proportion of fibre is preferably at least 2% by volume. The upper limit is determined by the desired strengthening effect in combination with the particular material composition of the matrix and monoclinic phase and can easily be ascertained by a few experiments. A proportion of fibre of 4 to 50% by volume is especially preferred. The fibres themselves preferably consist of whiskers but can also be replaced wholly or partly by polycrystalline fibres.

The whisker materials can be the known inorganic whisker substances, SiC, $Al_2O_3$ and $Si_3N_4$ alone or as mixtures being preferred.

The thickness of the whiskers is not important but a thickness of from 0.1 to 5 $\mu$m. is preferred.

As matrix materials, there can be used materials suitable for high-strength ceramic formed bodies, preferably $Al_2O_3$, partly stabilised $ZrO_2$ (PSZ), finely crystalline tetragonal $ZrO_2$ (TZP), cordierite, mullite, Mg—Al spinel, $Al_2TiO_5$, zircon, $Si_3N_4$ and $B_4C$, as well as mixtures thereof.

The content of monoclinic crystals of zirconium dioxide, hafnium dioxide or compositions thereof is preferably from 18 to 60% by volume.

FIGS. 1A and 1B respectively illustrate the Median Matrix Tension over a temperature range of from room temperature to Tg for $\Delta\alpha$ greater than zero and $\Delta\alpha$ less than zero.

An important advantage of the present invention in comparison with the previously developed ceramic fibre/ceramic matrix composite work materials (see, inter alia, I. W. Donald and P. W. McMillan, J. Mat. Sci., II, 949/1976) is the fact that the matrix, especially in the case of chemical bonding, is prestressed by the whiskers (compressive stresses, similar to reinforced concrete) even when the difference of the thermal coefficients of expansion ($\Delta\alpha = \alpha_m - \alpha_f > 0$; m: matrix, f: fibre/whisker) is positive, i.e. normally after cooling from the production temperature, inversed stress relationships (tension in the matrix, compression in the fibre/whisker) would prevail. This is due to the fact that a sufficient amount of zirconium dioxide (or of hafnium dioxide or zirconium dioxide-hafnium dioxide compositions) is added to the matrix which, after its transition from the tetragonal (t) lattice modification into the monoclinic (m) lattice modification at about 600° to 900° C., because of the volume expansion involved (about 5% by volume; see. inter alia, Advances in Ceramics, Vol. 12, 1984), places the incorporated whiskers under high tensile stresses. This principle, which is of great importance especially in the case of whiskers with low $\alpha$ (for example $\alpha(SiC) = 4.7 \times 10^{-6}/K$; $\alpha(Si_3N_4) = 3.2 \times 10^{-6}/K$), is described in more detail in the following with reference to the accompanying drawings (FIGS. 1A and B), whereby the statements made with regard to zirconium dioxide also apply in the same manner to hafnium dioxide and compositions.

In a ceramic matrix with a sufficient amount of whiskers (or also fibres) incorporated therein, in the case of cooling from the production temperature, from a temperature $T_g$ ($T_g$: temperature below which the stresses can no longer relax), tension (see FIG. 1A) or compressive stresses (see FIG. 1B) are built up on the basis of the thermal mismatch $\Delta\alpha$. Between $M_s$ and $M_f$ (martensite starting and end temperature), the zirconium dioxide phase in the matrix changes over from t→m and brings about, corresponding to the proportion by volume (V) in the matrix, compressive stresses ($\sigma^T$) which are compensated by the incorporated whiskers in the form of tensionale stresses. The average matrix stress ($\sigma m$) can be approximately calculated according to the following equations:

$$\delta_m = \frac{(a_m - a_f) E_f V_f \Delta T}{1 + V_f(E_f/E_m - 1)}$$

$$\delta_T = \frac{E_f V_f v \, \epsilon^T/3}{1 + V_f(E_f/E_m - 1)}$$

wherein $E_f$ and $E_m$ are the E modules of the whisker and of the matrix, respectively, $V_f$ is the proportion by volume of the whisker, $\epsilon^T (\approx 5\%)$ is the volume expansion of the zirconium dioxide brought about by the transition and v is the proportion by volume of the zirconium dioxide phase in the ceramic matrix which is capable of transition.

The prestressing of the matrix brought about by the transition is reduced between $M_f$ and ambient temperature (RT) in case A and is again increased in case B. The prestressing is first broken down in the case of exceeding the reverse transition (m→t) between $A_s$ and $A_f$ (austenite starting and end temperature; ~1000°-1170° C.), i.e. such ceramic composite materials can be used up to $A_s$ with utilisation of the high whisker strength, $A_s$ can be increased by admixing hafnium dioxide with the zirconium dioxide (for example zirconium dioxide + 10 mole % hafnium dioxide→$A_s$~ 1250° C.). The important prerequisite for the effectiveness of the present invention is the transition ability (transformability) of the zirconium dioxide phase admixed with the ceramic matrix in the case of the sufficiently high temperature (i.e. $M_s > 600°$ C.). This is achieved by adding at least 15% by volume of zirconium dioxide. Furthermore, compounds which stabilise the tetragonal or cubic form of zirconium dioxide, for example magnesium oxide, calcium oxide, yttrium trioxide and the like, should normally be avoided, apart from the case of strengthening PSZ and TZP ceramics (PSZ: partly stabilised zirconium dioxide; TZP: finely crystalline tetragonal zirconium dioxide; see, inter alia, Advances in Ceramics, Vol. 12 (1984)). This means that, in contradistinction to so-called zirconium dioxide strengthened (or transformation strengthened) ceramics, in which, at ambient temperature, fine tetragonal particles or mixtures of tetragonal and monoclinic particles or precipitates are incorporated, in the case of the present invention, either comparatively large particles (with $M_s$ temperatures > 600° C.) or a continuous monoclonic zirconium dioxide phase is present. In the case of zirconium dioxide-strengthened ceramics, which, inter alia, are described in U.S. Pat. Nos. 4,419,311; 4,298,385; 4,184,882; 4,218,253 and 4,322,249 and in Federal Republic of Germany Patent Specification No. 25 49 652, the strengthening action (stress-induced transformation or microcrack formation) usually decreases with increasing temperature (in this regard, also see N. Claussen, J. Mat. Sci. Eng., 71, 23/1985). In the case of most of the formed bodies according to the present invention (FIG. 1A), the pre-stressing increases with increasing temperature so that, in some cases, at first there is even to be expected an increase of strength with increasing temperature.

According to the present invention, there can also be achieved a combination of transition strengthening with prestress strengthening. Furthermore, in some cases, polycrystalline fibres can be used instead of whiskers, although with considerably lesser effectiveness.

The present invention also provides a process for the production of the new fibre-strengthened ceramic formed bodies, wherein matrix particles, tetragonal zirconium dioxide, hafnium dioxide or zirconium dioxide/hafnium dioxide composition particles and fibres are thoroughly mixed and hot pressed at a temperature above 1000° C.

The especial advantages of the whisker prestressing according to the present invention of a ceramic work material in comparison with the previously known fibre/whisker strenghtened ceramic composite materials are:

1. high fracture strength up to temperatures of about 1000° C. ($A_s$),
2. higher break resistance also in the case of chemical bonding between whiskers and matrix,
3. effective strengthening also with whiskers, the thermal coefficients of expansion of which are smaller than those of the matrix (especially in the case of combinations of PSZ or TZP ceramics with SiC whiskers),
4. strengthening effects also in the case of small proportions of whisker volume (<10% by volume) in the case of which, in a composite material, a closed porosity can already be achieved by pressureless sintering; in this way, a hot isostatic post-consolidation is possible without encapsulation.

On the basis of these properties, the formed bodies according to the present invention are especially suitable for (castable) motor parts, as machine and apparatus constructional parts and as cutting ceramics.

The following Examples are given for the purpose of illustrating the present invention:

EXAMPLE 1

To 100 g. of an aqueous suspension of 32% by volume of tetragonal zirconium dioxide (average powder particle size ~0.5 μm.) and 48% by volume aluminium oxide (~0.6 μm.) were added 20% by volume of SiC whiskers (Tateho Chemicals, SCW 1, 0.05 to 0.5 μm.), the mixture was dispersed with ultrasonics for 10 minutes and then mixed for 2 hours in a tumbler mixer with the help of synthetic resin balls (~3 mm. diameter). The slurry was subsequently spray dried and hot pressed in graphite matrices to give tablets (35 mm. diameter, 15 mm. thickness) (1500° C., 10 minutes). On the bending rodlets produced therefrom with the dimensions 3×3×30 mm, there were measured 4-point strengths of 880 MPa and a break resistance ($K_{Ic}$) of 8.5 MPa$\sqrt{m}$ (pressing-in method). The $M_s$ temperature was 750° C. and >95% of the zirconium dioxide was present in monoclinic form.

EXAMPLE 2

As in example 1, samples were prepared from 100 g. of a mixture of 48% by volume zirconium dioxide, 48% by volume aluminium oxide and 4% by volume SiC whiskers. The strength was 480 MPa and $K_{Ic}$=5.4 MPa$\sqrt{m}$. The zirconium dioxide was practically completely monoclinic. A similar sample produced without SiC whiskers was penetrated many times by cracks and, therefore, did not have a measurable strength.

EXAMPLE 3

As in Example 1, samples were hot pressed at a temperature of 1350° C. for 10 minutes from 100 g. of a mixture of 40% by volume zirconium dioxide, 40% by volume cordierite and 20% by volume SiC whiskers. The bending strength of rodlets produced therefore was 520 MPa and the $K_{Ic}$ was 6.3 Mpa$\sqrt{m}$. Similar samples without SiC whiskers had a strength of 250 MPa; cracks such as in Example 2 were here not ascertainable because a thin glass phase between the grains relaxed the transition stresses.

EXAMPLE 4

As in Example 3, a sample was hot pressed at 1600° C. for 20 minutes for 60% by volume mullite, 20% by volume zirconium dioxide and and 20% by volume SiC whiskers. The strength was 610 MPa.

EXAMPLE 5

As in Example 1, samples were hot pressed at 1450° C. for 10 minutes from 100 g. of a mixture of 40% by volume 3y-TZP powder (zirconium dioxide with 3 mole % ytrium trioxide, Toyo Soda Chem., Japan; average particle diameter ~0.3 μm.), 30% by volume zirconium dioxide and 30% by volume SiC whiskers. The bending strength at ambient temperature was 1150 MPa (1300 MPa) and at 1000° C. was 460 MPa (190 MPa); the $K_{Ic}$ at ambient temperature was 14.4 MPa$\sqrt{m}$ (6.5 MPa$\sqrt{m}$). The values given above in brackets refer to similarly produced 3y-TZP without monoclinic zirconium dioxide and without SiC whiskers.

EXAMPLE 6

Corresponding to Example 5, samples were produced with aluminium oxide whiskers (obtainable from the firm Thermokinetics, Washington) instead of with SiC whiskers. The strength at ambient temperature was 1080 MPa and the $K_{Ic}$ was 11.8 MPa$\sqrt{m}$.

EXAMPLE 7

Corresponding to Example 5, instead of with 3y-TZP powder, samples were hot pressed at 1700° C. for 30 minutes with 3 Mg-PSZ powder (zirconium dioxide containing 3 mole % magnesium oxide, obtainable from the firm Magnesium Elektron, Twickenham, England) with 30% by volume aluminium oxide whiskers (instead of SiC whiskers). After a calcination time of 2 hours at 1420° C., the ambient temperature strength was 880 MPa and the $K_{Ic}$ was 13.6 MPa$\sqrt{m}$. The bending strength at 1000° C. was 440 MPa.

We claim:

1. A fibre-strengthened ceramic formed body with improved mechanical strength comprising at least 15% by volume of zirconium dioxide, hafnium dioxide or zirconium dioxide/hafnium dioxide composition in the form of monoclinic crystals and an amount of inorganic fibres sufficient for increasing the strength, in a ceramic matrix material, said formed body being formed by hot pressing the mixture of ceramic matrix material, at least 15% by volume of tetragonal zirconium dioxide, hafnium dioxide or zirconium dioxide/hafnium dioxide composition particles and the fibres, at a temperature above the tetragonal→monoclinic transition temperature.

2. The formed body of claim 1, wherein the proportion of fibres is at least 2% by volume.

3. The formed body of claim 1, wherein the proportion of fibres is from 4 to 50% by volume.

4. The formed body of claim 1, wherein the fibres consist wholly or partly of whiskers.

5. The formed body of claim 4, wherein the whiskers consist of SiC, $Si_3N_4$, $Al_2O_3$ or any combination thereof.

6. The formed body of claim 5, wherein the whiskers have a thickness of 0.1 to 5 μm.

7. The formed body of claim 1, wherein the ceramic matrix material consists of $Al_2O_3$, partially stabilized zirconia, tetragonal zirconia polycrystals, cordierite, mullite, Mg—Al spinel, $Al_2TiO_5$, zircon, $Si_3N_4$, $B_4C$ or a mixture thereof.

8. The formed body of claim 1, wherein the monoclinic crystals are present in an amount of from 18 to 60% by volume.

9. The formed body of claim 4, comprising the ceramic matrix material of partly stabilised or finely crystalline tetragonal zirconium dioxide, at least 20% by weight of the whiskers and having a break resistance $K_{Ic}$ of at least 10 MPa$\sqrt{m}$.

10. The formed body of claim 4 wherein the whiskers have a thickness of 0.1 to 5 μm.

11. The formed body of claim 7 wherein the proportion of fibers is at least 2% by volume, the fibers comprising whiskers of SiC, $Si_3N_4$, $Al_2O_3$ or any combination thereof.

12. The formed body of claim 4 comprising the ceramic matrix material of partly stabilised or finely crystalline tetragonal zirconium dioxide, 18-60% by volume of the monoclinic crystals and 4 to 50% by volume of the whiskers.

* * * * *